(12) United States Patent
McCarty, Jr.

(10) Patent No.: US 10,791,746 B2
(45) Date of Patent: Oct. 6, 2020

(54) DOUGH PROCESSING APPARATUS AND ASSOCIATED METHODS

(71) Applicant: Jerold S. McCarty, Jr., Tenino, WA (US)

(72) Inventor: Jerold S. McCarty, Jr., Tenino, WA (US)

(73) Assignee: Specialty Food Manufacturing Machines and Devices, LLC, Tenino, WA (US)

( * ) Notice: Subject to any disclaimer, the term of this patent is extended or adjusted under 35 U.S.C. 154(b) by 0 days.

(21) Appl. No.: 16/411,044

(22) Filed: May 13, 2019

(65) Prior Publication Data
US 2019/0343131 A1 Nov. 14, 2019

Related U.S. Application Data

(60) Provisional application No. 62/671,345, filed on May 14, 2018.

(51) Int. Cl.
*A21C 3/02* (2006.01)

(52) U.S. Cl.
CPC ............... *A21C 3/024* (2013.01); *A21C 3/02* (2013.01)

(58) Field of Classification Search
CPC .................................. A21C 3/02; B29C 43/46
USPC ........................................................ 425/367
See application file for complete search history.

(56) References Cited

U.S. PATENT DOCUMENTS

| | | | | |
|---|---|---|---|---|
| 2,323,907 A | * | 7/1943 | Harriss | A21C 3/02 425/335 |
| 2,791,974 A | * | 5/1957 | Copenhaver | A21C 3/02 425/367 |
| 2,829,606 A | * | 4/1958 | Dielentheis | A21C 3/02 425/328 |
| 3,367,289 A | * | 2/1968 | Bloemhof | A21C 3/02 425/170 |
| 3,792,948 A | * | 2/1974 | Martinez | A21C 3/02 425/182 |
| 5,112,208 A | * | 5/1992 | Voth | A21C 3/02 264/175 |
| 5,180,593 A | * | 1/1993 | Mistretta | A21C 3/02 425/202 |
| 5,674,543 A | * | 10/1997 | Partida | A21C 3/02 100/168 |
| 5,811,137 A | * | 9/1998 | Clark | A21C 3/02 100/168 |

* cited by examiner

*Primary Examiner* — James P Mackey
(74) *Attorney, Agent, or Firm* — Perkins Coie LLP

(57) ABSTRACT

The present disclosure relates to apparatus and methods for processing food materials such as dough. The apparatus includes (1) a frame formed with a trough hole and a slot; (2) a motor obliquely attached to a side wall of the frame; (3) a rear roller positioned in the slot and operably coupled to the motor by a driving gear; (4) a front roller positioned in the slot and operably coupled to the rear roller via a transmission gear set; and (5) a cam component operably attached to the frame and positioned adjacent to the front roller. When the cam portion is rotated, the front roller is moved toward or far away from the rear roller.

15 Claims, 20 Drawing Sheets

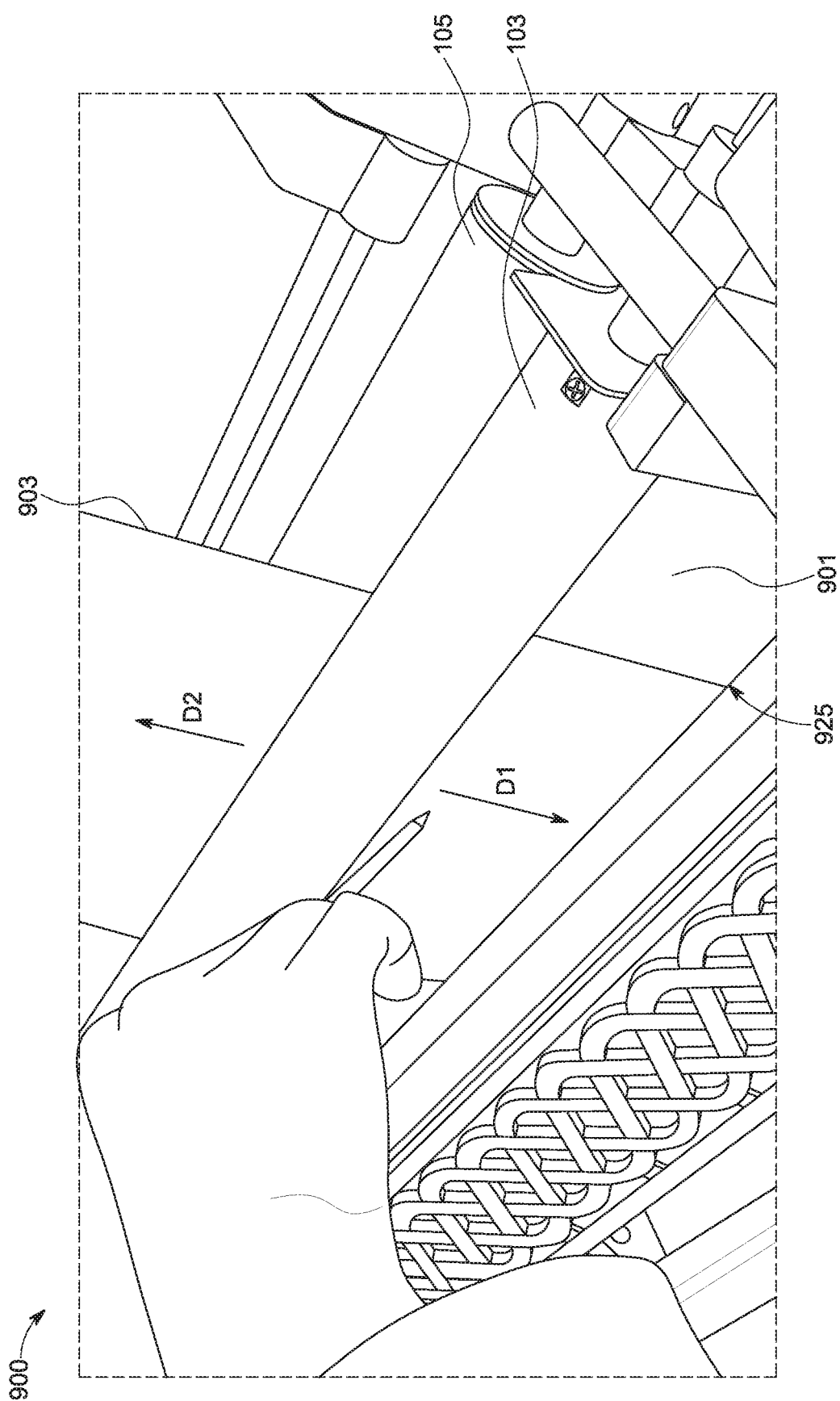

DOUGH PROCESSING APPARATUS AND ASSOCIATED METHODS

CROSS-REFERENCE TO RELATED APPLICATION(S)

This application claims priority to U.S. Provisional Patent Application No. 62/671,345, filed May 14, 2018, titled DOUGH PROCESSING APPARATUS AND ASSOCIATED METHODS, which is hereby incorporated by reference in its entirety.

TECHNICAL FIELD

The present technology is directed to apparatus and methods for processing dough or other similar food items. More particularly, the present technology is directed to a vertical, revisable dough sheeting device that is easy to operate and convenient to maintain.

BACKGROUND

Traditional dough processing machines are usually expensive and require a large space to install. These traditional machines also need to be operated by well-trained operators and require professional maintenance. It can be challenging for some users to afford the expenses for owning, maintaining, and operating such traditional machines. Therefore, it is advantageous to have an improved apparatus that is inexpensive, easy to install/uninstall, and simple to operate.

BRIEF DESCRIPTION OF THE DRAWINGS

Embodiments of the disclosed technology will be described and explained through the use of the accompanying drawings.

FIG. 9c is a schematic diagram showing a reversible dough sheeting process in accordance with embodiments of the disclosed technology.

Figure 1A:
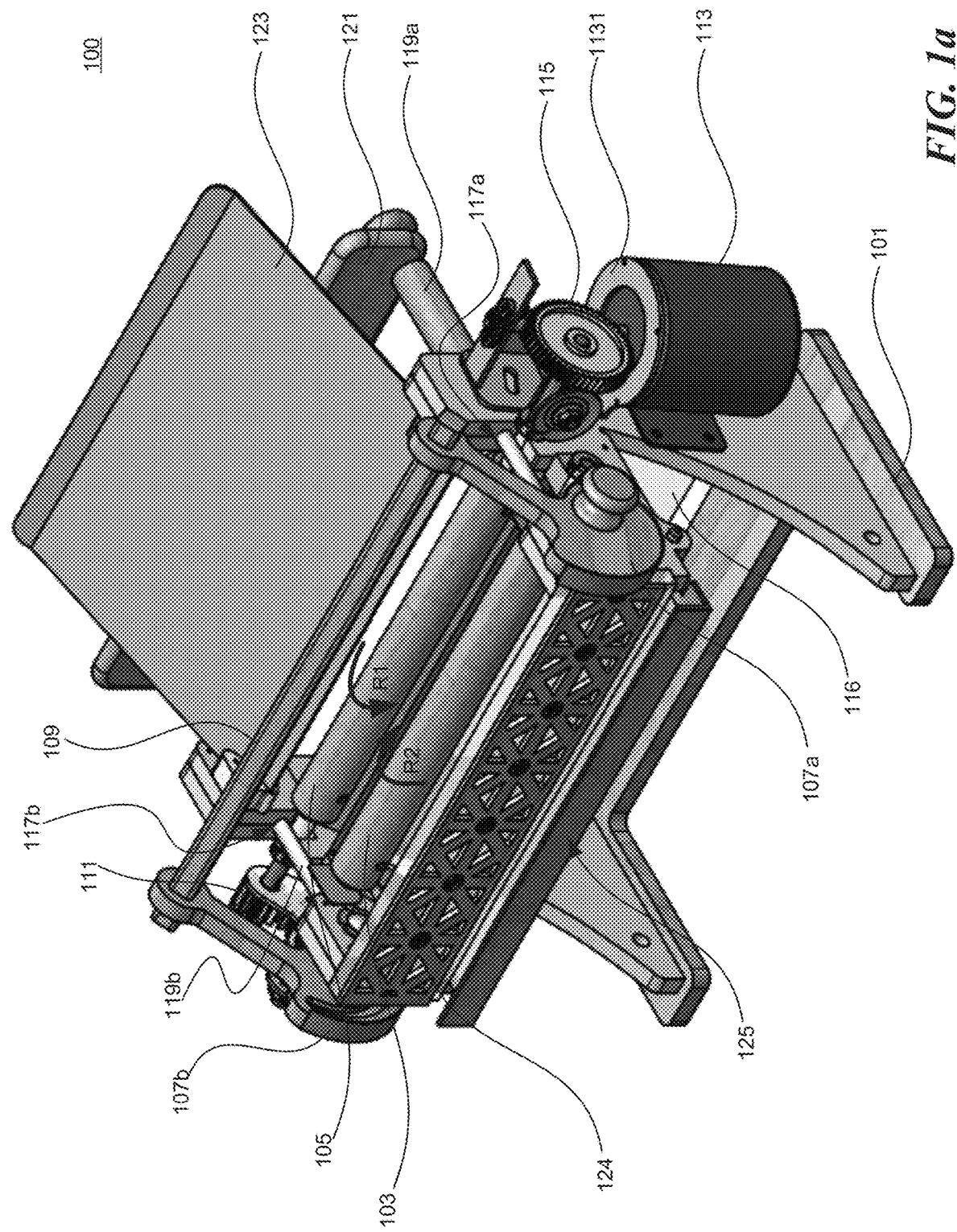
FIG. 1a is an isometric view illustrating a dough sheeting apparatus in accordance with embodiments of the disclosed technology.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of this specification.

DETAILED DESCRIPTION

In this description, references to "some embodiments," "one embodiment," or the like, mean that the particular feature, function, structure or characteristic being described is included in at least one embodiment of the disclosed technology. Occurrences of such phrases in this specification do not necessarily all refer to the same embodiment. On the other hand, the embodiments referred to are not necessarily mutually exclusive.

The present disclosure relates to a food processing apparatus (e.g., a dough sheeter) that can be used to process a wide range of food materials with various sizes/dimensions due to its "open," "dynamically-adjustable," and "reversible" designs. The present apparatus's "open" design enables an operator to insert a relatively large food item into the apparatus from various angles (see e.g., FIG. 3). The "dynamically-adjustable" design enables an operator to instantly adjust (e.g., the thickness of) the food item that the apparatus is currently processing (see e.g., FIG. 10a-10c). The "reversible" design of the present apparatus allows an operator to clearly observe the food item that the apparatus is currently processing in a forward direction, and accordingly enables the operator to precisely determine at which point the operator wants the food item to be proceeded in a reverse direction (see e.g., FIG. 9c). In short, the present apparatus provides operators flexibility to process food items in an efficient, relatively-simple fashion.

Another aspect of the present disclosure is to provide a food processing apparatus that is compact, inexpensive, easy-to-operate/install, and convenient to maintain/clean.

The present apparatus can be easily installed or uninstalled, which enables a user to quickly clean it up, maintain it, and/or to replace its parts. The present apparatus does not require a trained professional or technician to operate or maintain. In addition, the present apparatus can be operated by visually-challenged operators at least because the present apparatus enables an operator to gauge/adjust the thickness of a food item to be processed based on the operator's tactile sensation (see e.g., FIG. 10a-10c).

In the following description, for the purposes of explanation, numerous specific details are set forth in order to provide a thorough understanding of embodiments of the present technology. It will be apparent, however, that embodiments of the present technology may be practiced without some of these specific details.

Figure 1B:
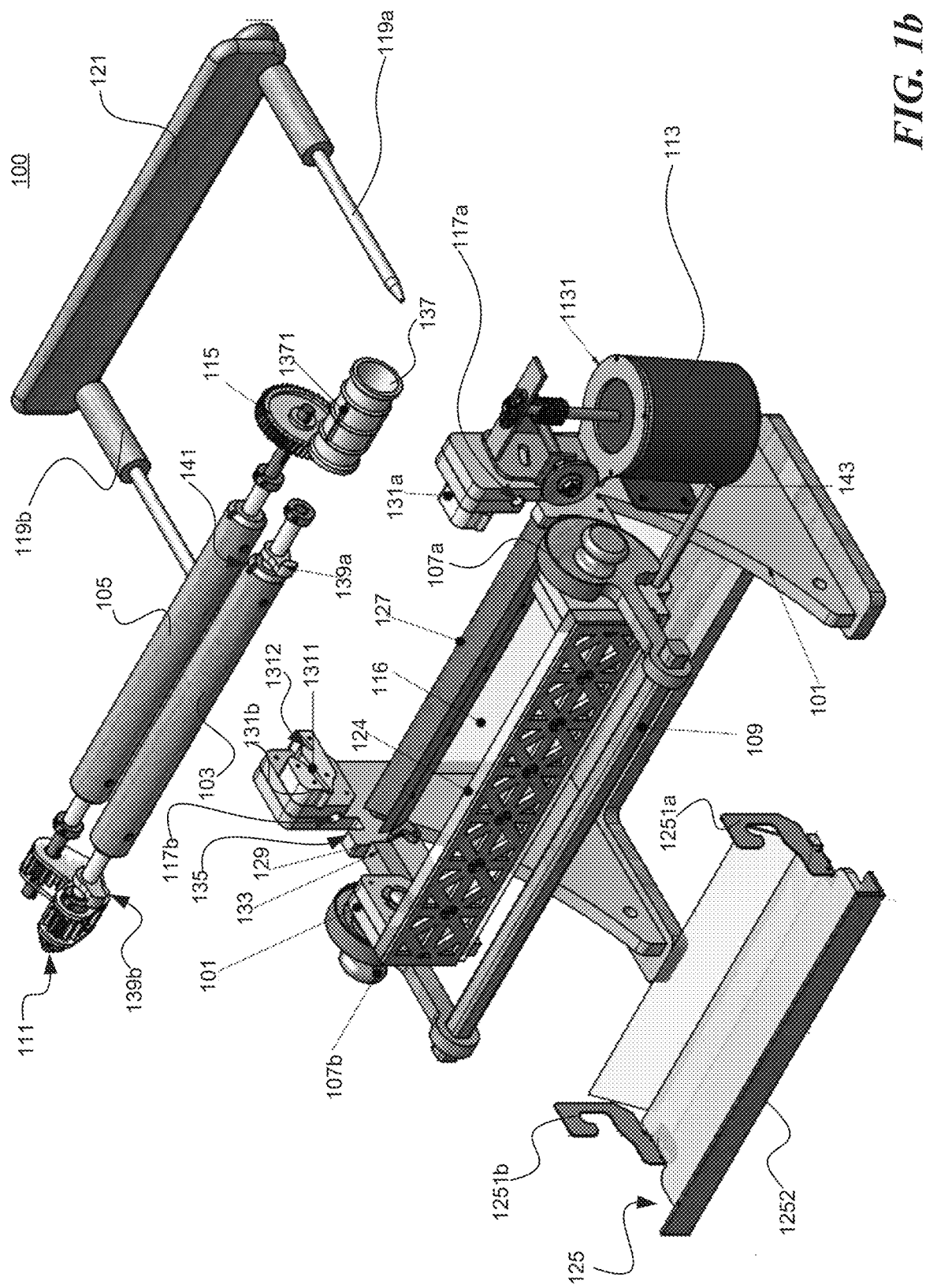
FIG. 1b is an exploded view illustrating the dough sheeting apparatus in accordance with embodiments of the disclosed technology.

FIG. 1a is an isometric view illustrating a dough sheeting apparatus 100 in accordance with embodiments of the disclosed technology. FIG. 1b is an exploded, isometric view showing the dough sheeting apparatus 100. As shown in FIGS. 1a and 1b, the dough sheeting apparatus 100 includes a frame 101, a front roller 103 positioned on the frame 101, a rear roller 105 positioned adjacent to the front roller 103, two cam components 107a, 107b positioned on two sides of the frame 101, a handle bar 109 coupled to the two cam components 107a, 107b, a roller-transmission gear set 111 configured to coordinate the rotations of the front and rear rollers 103, 105, and a motor 113 attached to the frame 101 via a motor chassis 1131 and configured to drive the rear roller 105 via a driving gear 115.

In response to the rotation of the rear roller 105 (e.g., in Direction R1), the roller-transmission gear set 111 rotates the front roller 103 in an opposite direction (e.g., Direction R2) at a substantially the same rotational speed. By this arrangement, a user can position dough to be processed between the front roller 103 and the rear roller 105 such that the rollers 103, 105 can press and flatten the dough. Once the dough passes through the front roller 103 and the rear roller 105, it can fall and be supported or held by a rear sheet panel 116.

As shown in FIGS. 1a and 1b, the frame 101 is formed with two through holes 117a, 117b. The through holes 117a, 117b are configured to receive two positioning rods 119a, 119b, respectively. The frame 101 can be formed with a front roller slot 133 configured to receive the front roller 103 and a rear roller slot 135 configured to receive the rear roller 105. After the front roller 103 is positioned in the front roller slot 133 and the rear roller 105 is positioned in the rear roller slot 135, the positioning rods 119a, 119b can pass through the through holes 117a, 117b, respectively, so as to maintain the positions of the front roller 103 and the rear roller 105. The positioning rods 119a, 119b are coupled by a tray rest 121, which is configured to support a dough feed tray 123. As also shown, a front panel 124 is coupled to the frame 101 so as to enhance its structural rigidity.

The dough sheeting apparatus 100 also include a front scraper 125 detachably attached to the front roller 103. The front scraper 125 is configured to remove excess food materials from the front roller 103, and receive the removed excess food materials. The apparatus 100 can also include a rear scraper 127. The rear scraper 127 is supported by two support saddles 129 (only one shown in FIG. 1b), which is rotatably attached to the frame 101. Embodiments of the support saddle 129 are discussed in detail with reference to FIGS. 12a and 12b.

As shown in FIG. 1b, the apparatus 100 can include two tray supports 131a, 131b. The tray supports 131a, 131b are attached to the frame 101 and configured to support the feed tray 123. A shown, the tray support 131a includes a first receiving slot 1311 and a second receiving slot 1312 configured to position the feed tray 123 at different angles.

In some embodiments, the apparatus 100 can include a cutter die 137 slidably positioned on the front roller 103. The cutter die 137 is configured to cut the food material positioned between the front roller 103 and the rear roller 105 into predetermined shapes (e.g., a stripe, a circle, etc.). As shown in FIG. 1b, the cutter die 137 can include a blade 1371 formed/positioned thereon. The blade 1371 is configured to cut or separate the foregoing food material into predetermined dimensions.

Figure 8A:
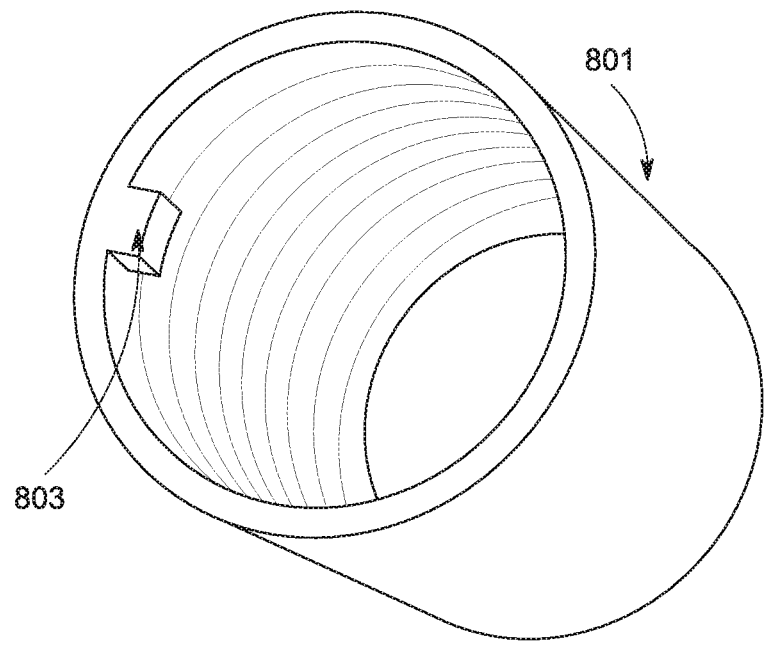
FIG. 8a is a schematic diagram illustrating a cutter die in accordance with embodiments of the disclosed technology.
Figure 8B:
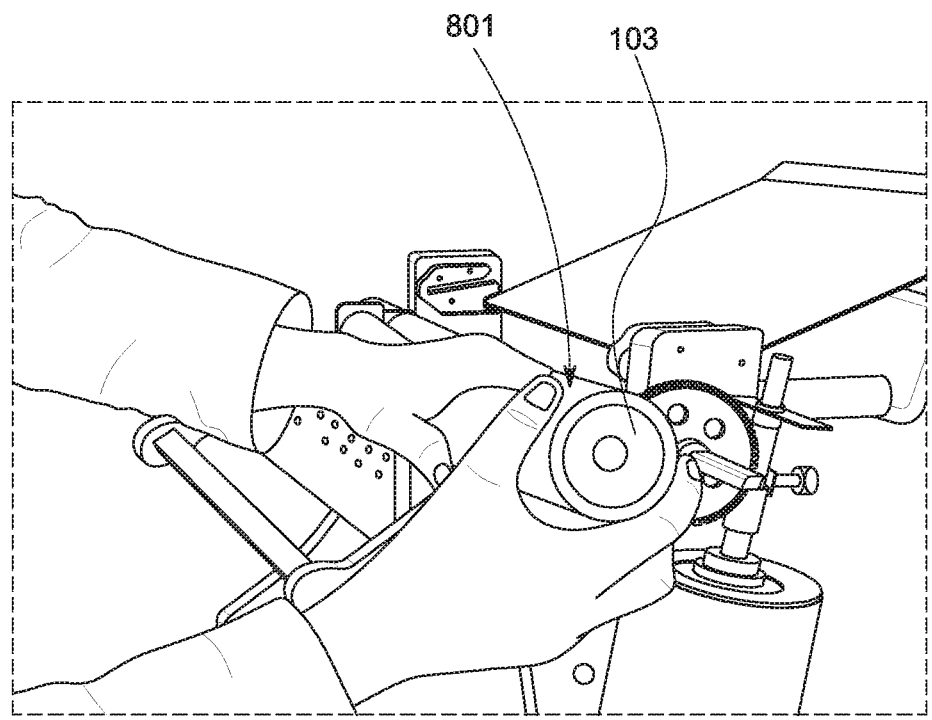
FIG. 8b is a schematic diagram illustrating a cutter die operably connecting with a roller in accordance with embodiments of the disclosed technology.

As shown in FIG. 8a, a cutter die 801 includes a tab 803 configured to couple the cutter die 801 to the front roller 103. As shown in FIG. 1b, the front roller 103 is formed with a tab-recess 141 configured to receive the tab 803. When the tab is fitted or inserted in the tab-recess 141 (FIG. 8b), the cutter die 801 can rotate with the front roller 103. In some embodiments, the cutter die 137 can be positioned on the rear roller 105.

Figure 6A:
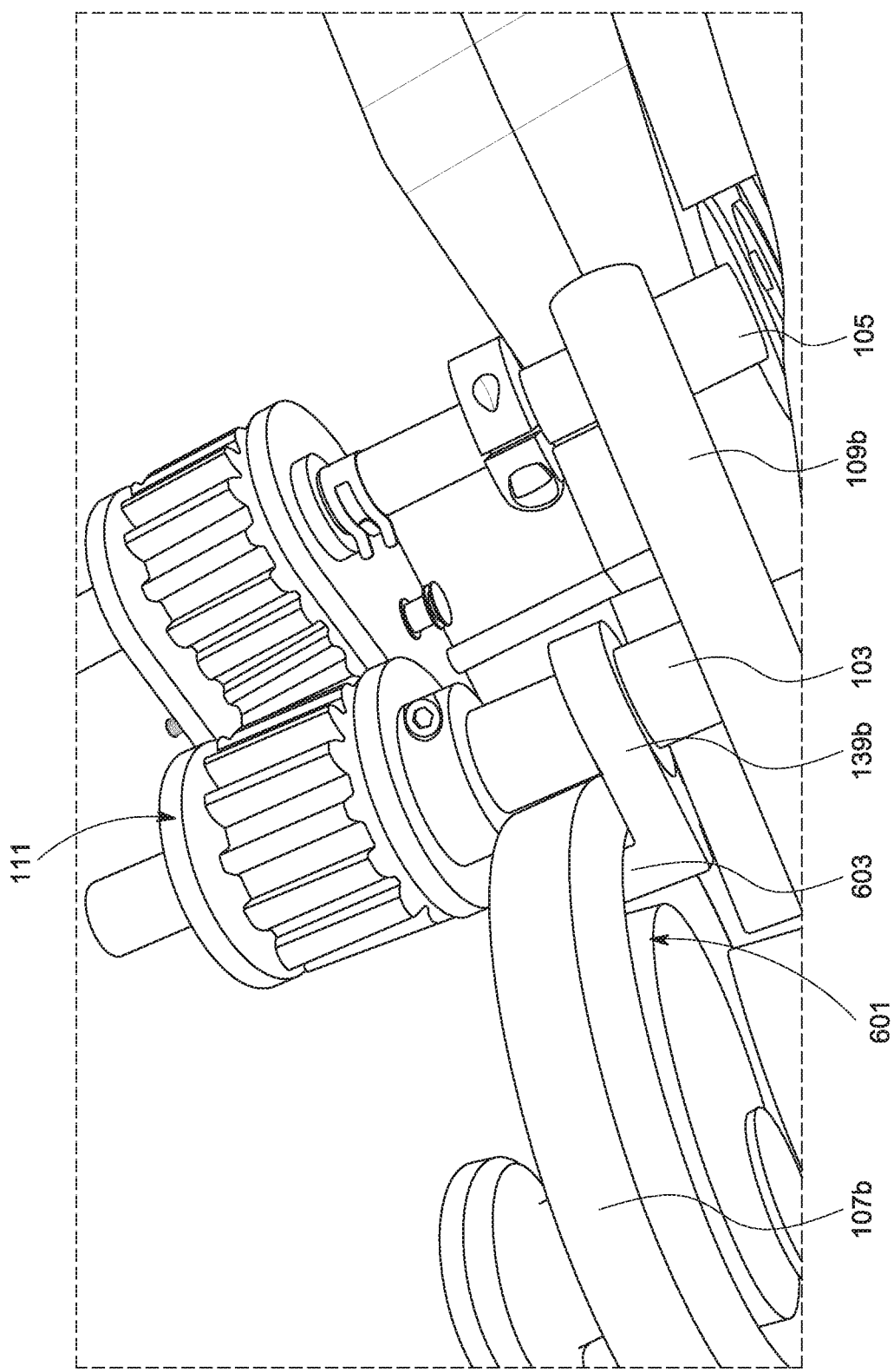
FIG. 6a is a schematic diagram illustrating a linking member operably connecting a cam component and a front roller in accordance with embodiments of the disclosed technology.

Referring back to FIG. 1b, two linking members 139a, 139b are positioned on two ends of the front roller 103, respectively. The linking member 139a is rotatably positioned outside the front roller 103 and is configured to operably couple the front roller 103 to the cam component 107a. The linking member 139b is also rotatably positioned outside the front roller 103 and is configured to operably couple the front roller 103 to the cam component 107b. Referring to FIG. 6a, the cam component 107b is formed with a recess 601. The recess 601 is configured to receive a protrusion 603 of the linking member 139b. When the cam portion 107b rotates (e.g., FIG. 10a-10c) by an operator by rotating the handle 109, the front roller 103 can be moved toward or away from the rear roller 105. By this arrangement, the distance between the front roller 103 and the rear roller 105 can be dynamically adjusted by the operator. As a result, the thickness of the food material to be processed/gauged by the front and rear rollers 103, 105 can be adjusted accordingly. This configuration also allows a user to easily and manually control the amount of pressure that the rollers 103 and 105 apply to the food material moving between the rollers.

Figure 6B:
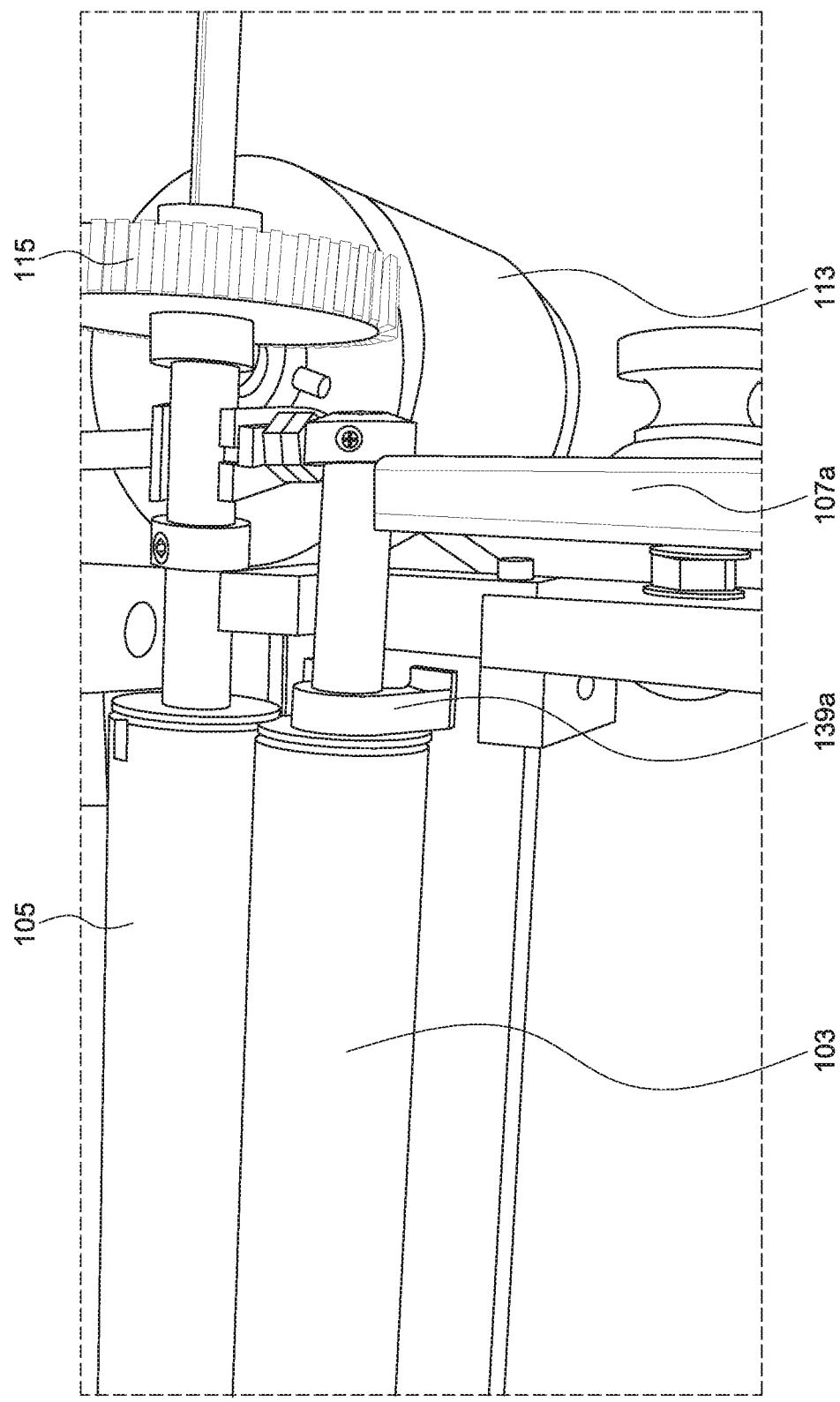
FIG. 6b is a schematic diagram illustrating a linking member disengaging from a cam component in accordance with embodiments of the disclosed technology.

FIG. 6b is a schematic diagram showing the linking member 139a disengaging from the cam component 107a. As shown, when a user wants to remove the front roller 103 from the apparatus 100, the user can move the linking member 139a away from the cam component 107a such that the cam component 107a disengages from the front roller 103. After the disengagement, the front roller 103 can be removed.

Referring back to FIG. 1b, the front scraper 125 includes two hooks 1251a, 1251b configured to operably couple to the front roller 103, respectively. A support dowel 143 can be positioned underneath the front scraper 125 so as to support or align the same. The front scraper 125 also includes a shim stop 1252 configured to be in contact with a shim (e.g., element 201 shown in FIG. 2 or 4) such that the shim can determine the minimum distance between the front roller 103 and the rear roller 105.

Figure 2:
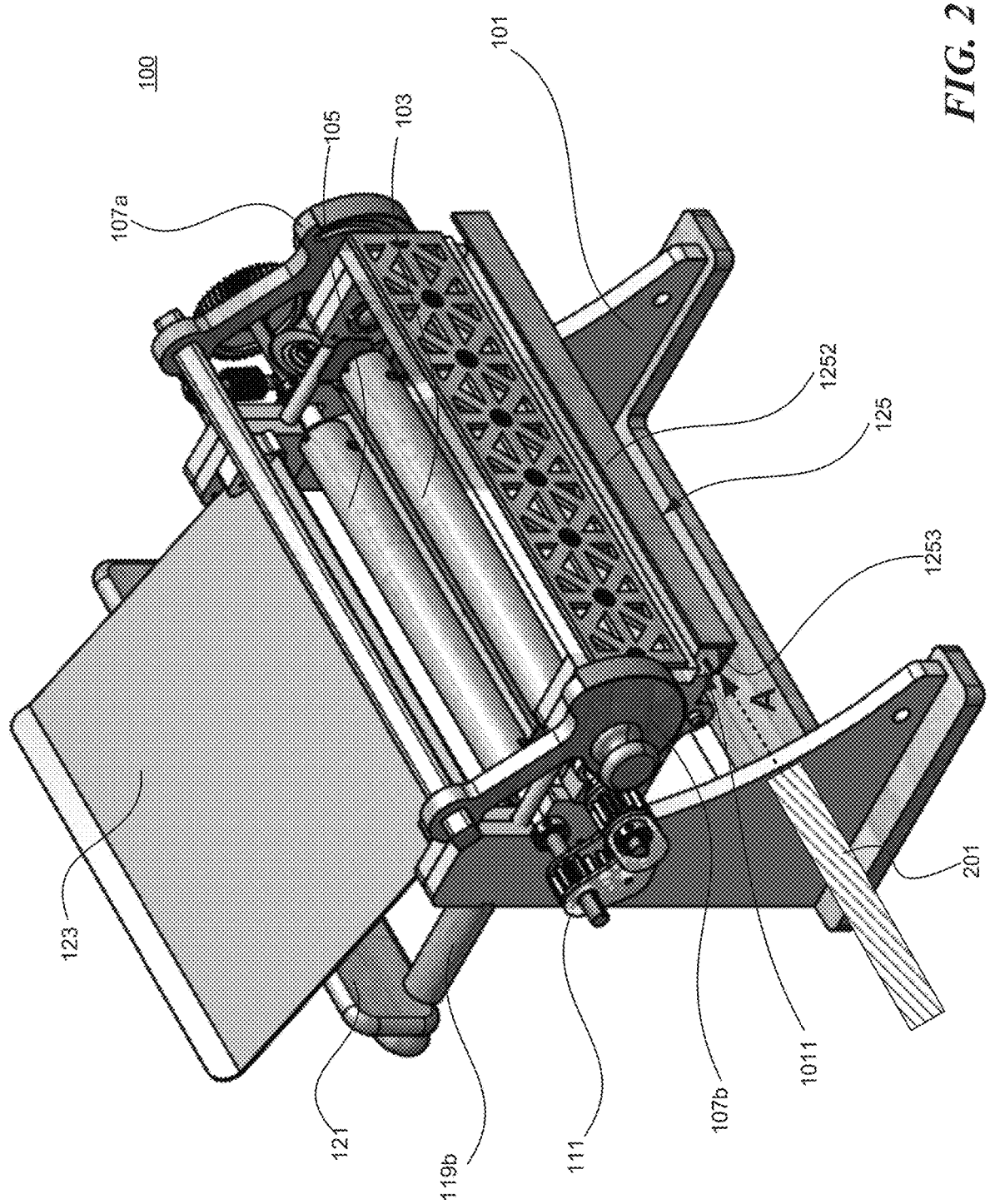
FIG. 2 is an isometric view of the dough sheeting apparatus in accordance with embodiments of the disclosed technology.
Figure 4:
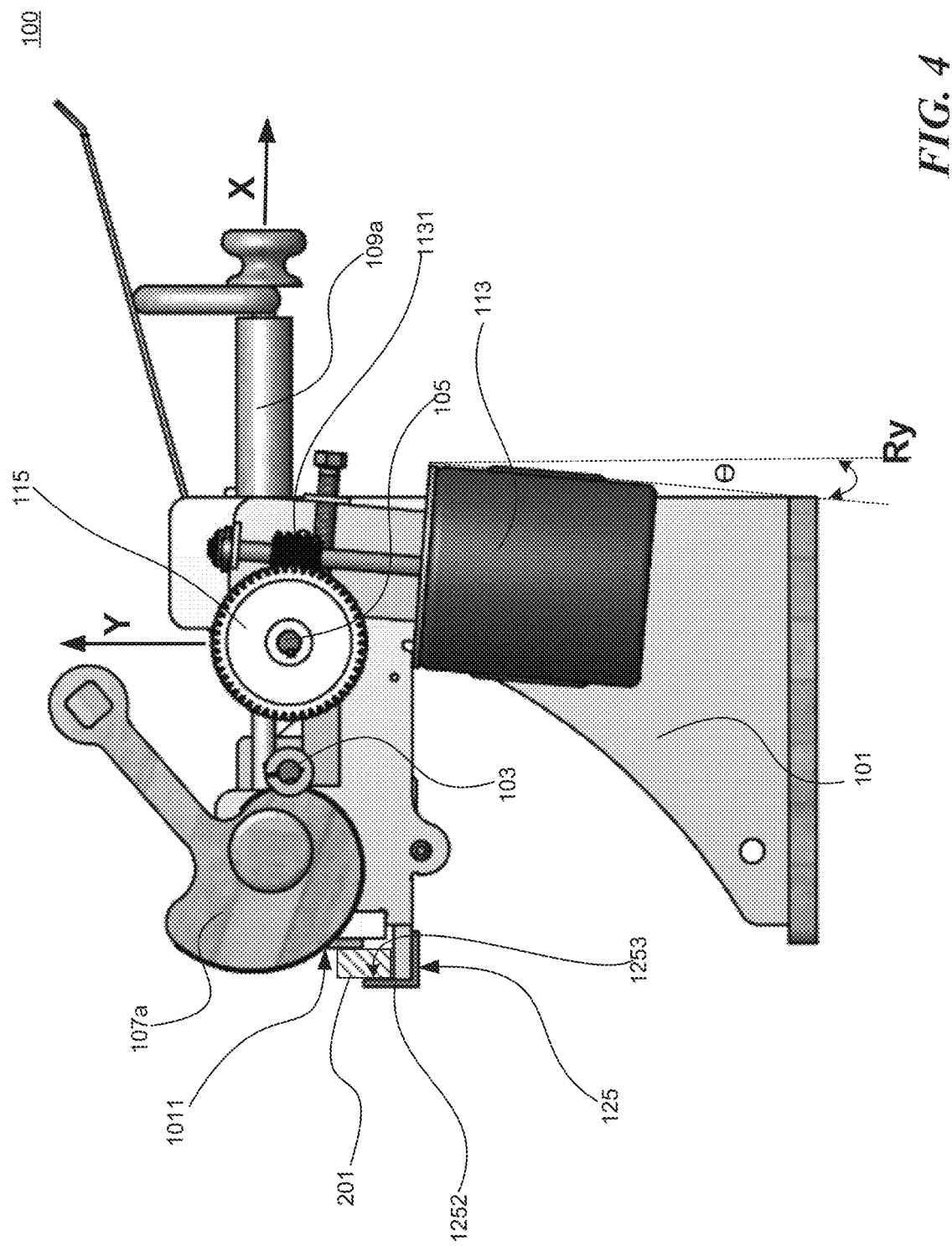
FIG. 4 is a side view illustrating the dough sheeting apparatus in accordance with embodiments of the disclosed technology.
Figure 10A:
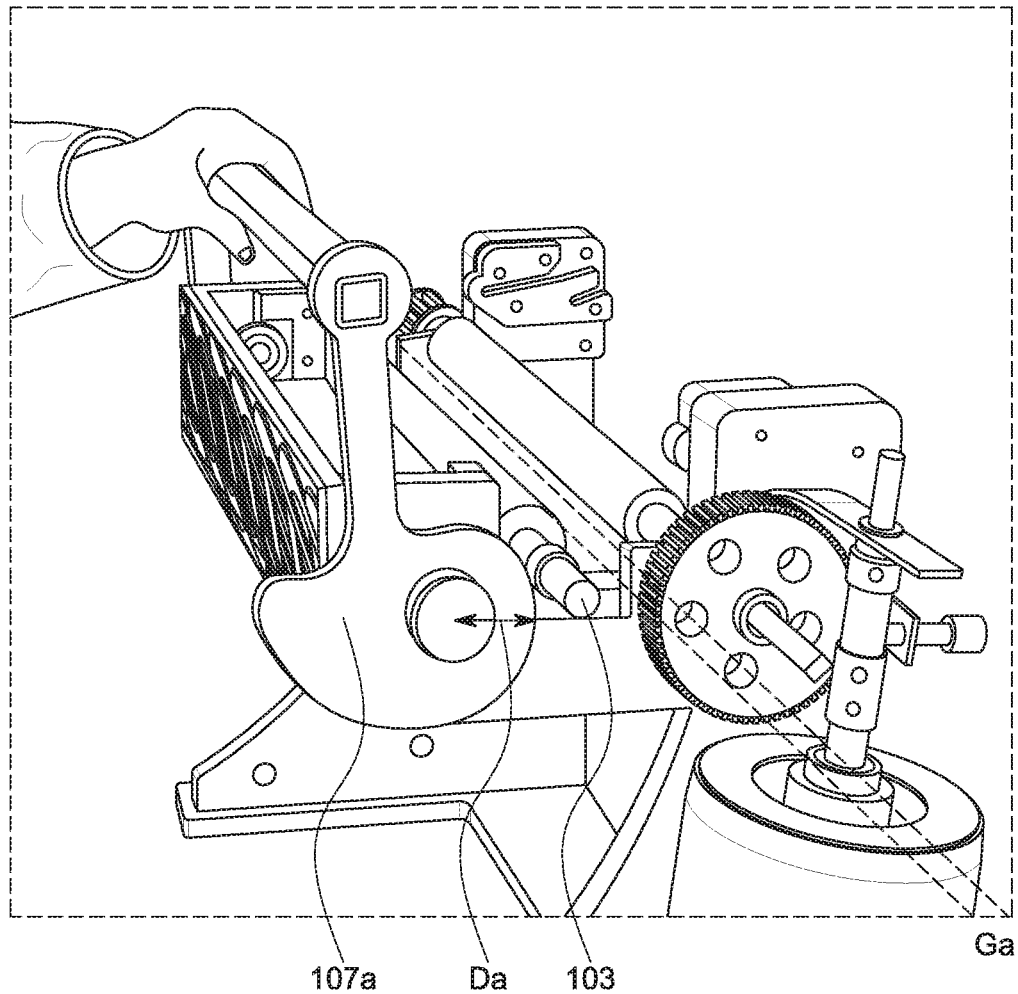
FIGS. 10a-10c are schematic diagrams illustrating operations of a dough sheeting apparatus in accordance with embodiments of the disclosed technology.
Figure 10B:
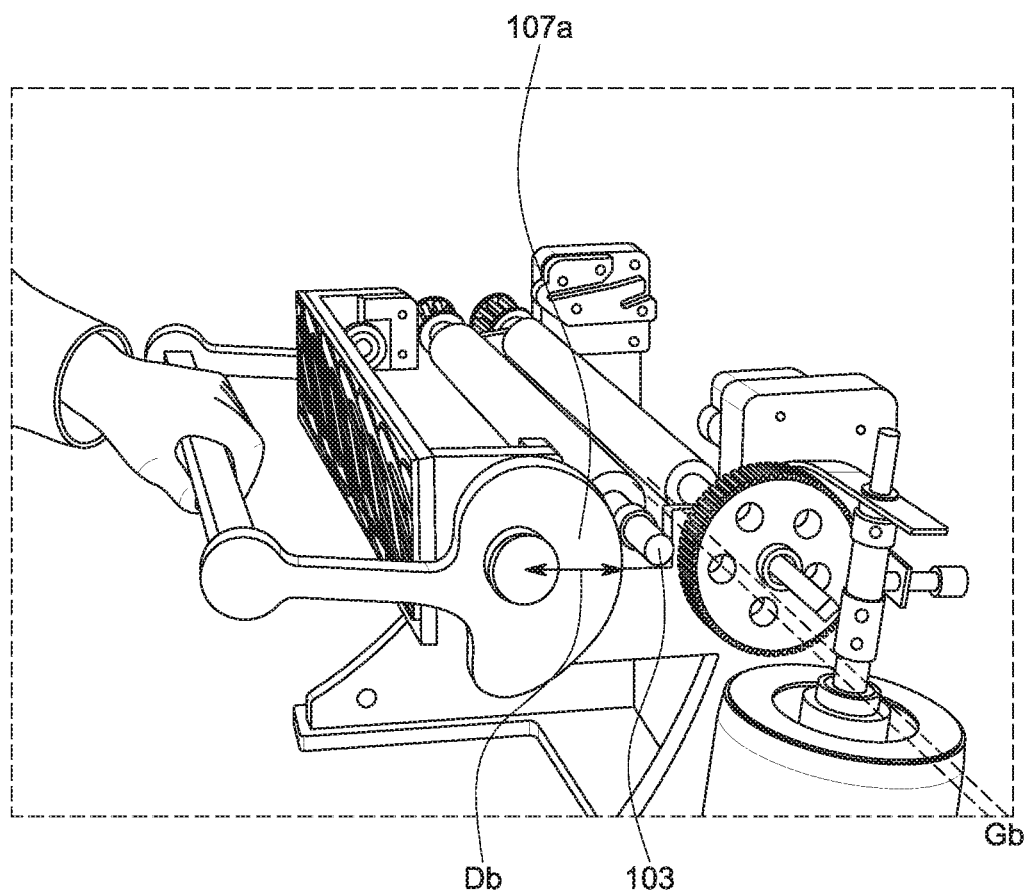
Figure 10C:
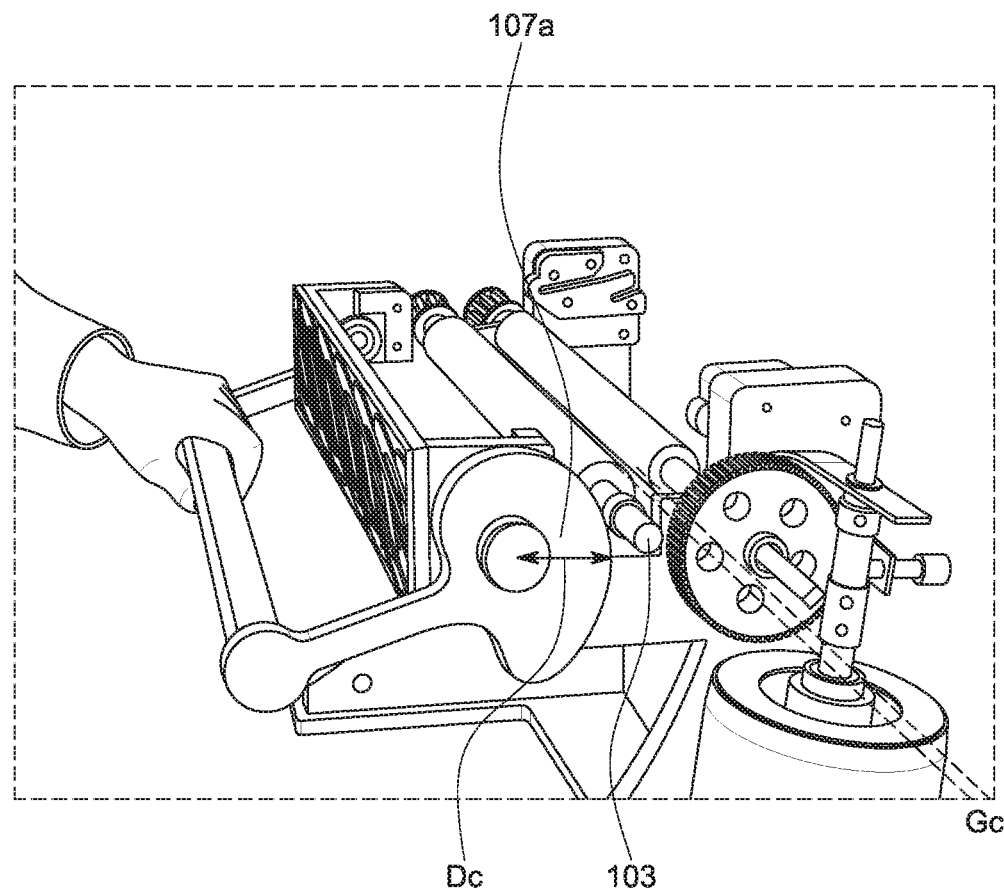

FIGS. 2 and 4 are isometric and side views of a shim 201 and the dough sheeting apparatus 100 in accordance with embodiments of the disclosed technology. As shown, the shim 201 can be positioned (in direction A, FIG. 2) between a contacting surface 1011 of the frame 101 and an inner surface 1253 of the front scraper 125 (FIGS. 2 and 4). When an operator wants to increase the minimum distance between the front roller 103 and the rear roller 105 (e.g., to create a thicker dough sheet), the operator can insert or position a shim 201 with a larger dimension between the contacting surface 1011 of the frame 101 and the inner surface 1253 of the front scraper 125. Alternatively, the user can position two or more shims 201 between the contacting surface 1011 and the inner surface 1253, such that the combination of the shims define the minimum distance between the front and rear rollers 103 and 105. In some embodiments, the apparatus 100 can be operated without the shim 201. In such embodiments, the minimum distance between the front roller 103 and the rear roller 105 is determined based on the locations of the cam components 107a, 107b (FIG. 10a-10c). By allowing an operator to adjust the locations of the cam components 107s, 107b and to determine whether to positioning the shim 201 (and the size/dimension of the shim 201), the claimed apparatus enables the operator to "dynamically adjust" the thickness of the food item to be processed.

Figure 3:
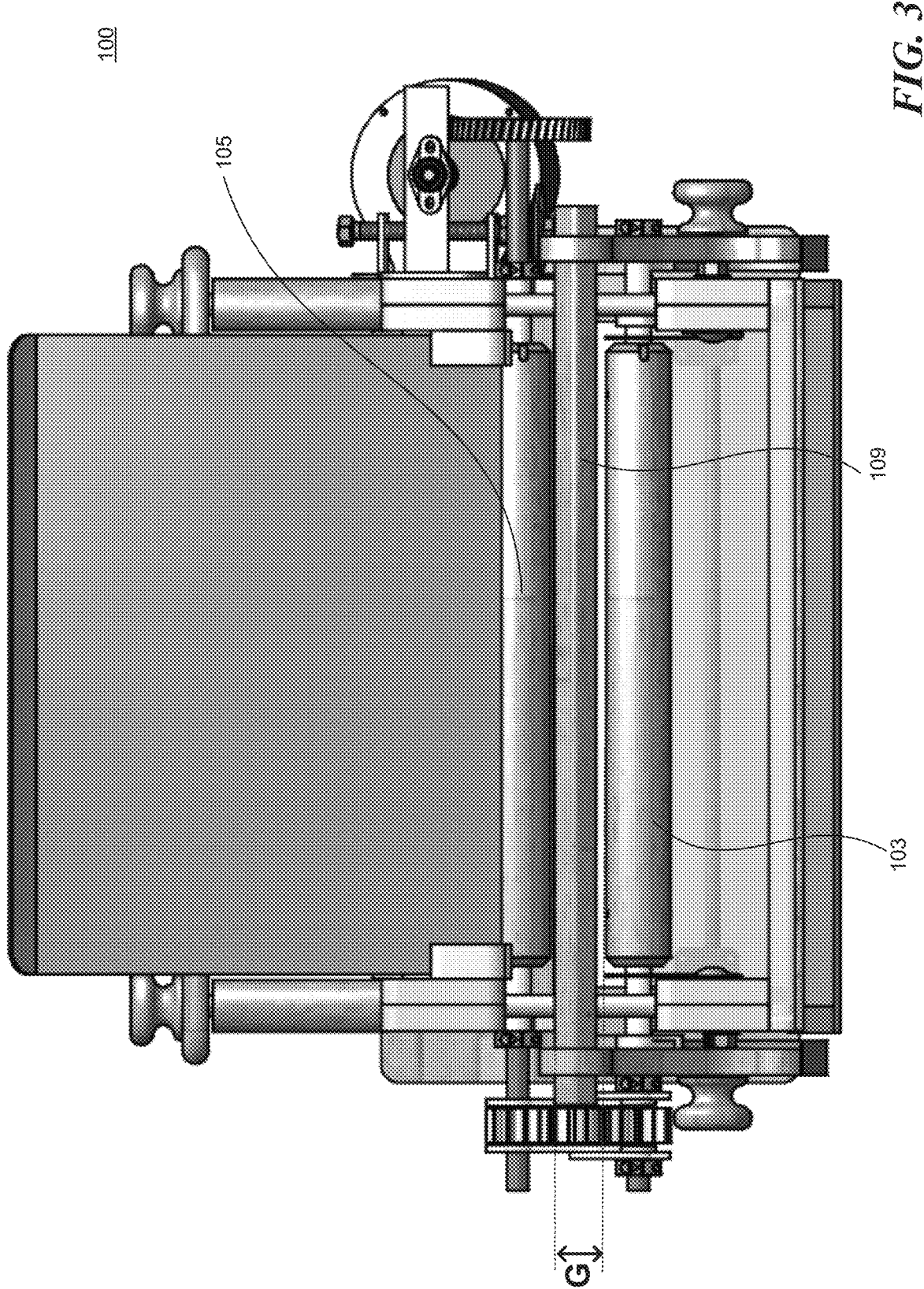
FIG. 3 is a top view of the dough sheeting apparatus in accordance with embodiments of the disclosed technology.

FIG. 3 is a top view of the dough sheeting apparatus 100 in accordance with embodiments of the disclosed technology. As shown, a gap G is formed between the front roller 103 and the rear roller 105. As shown in FIG. 3, the apparatus 100 has an "open" configuration such that an operator can put the food item to be processed from the top of the apparatus 100. This "open" design is advantageous especially for processing large, stiff, or oddly shaped food items.

As discussed above, the gap G can be adjusted by rotating the handle bar 109. FIGS. 10a-10c illustrate how an operator can rotate the handle bar 109 to adjust the gap G between the front roller 103 and the rear roller 105. In FIG. 10a, the distance between the two rollers is "Ga", which corresponds to horizontal distance "Da" between the center of the cam component 107a and an edge of the cam component where it contacts the front roller 103. Similarly, in FIG. 10b, the distance between the two rollers is "Gb", which corresponds to horizontal distance "Db." In FIG. 10c, the distance between the two rollers is "Gc" which corresponds to horizontal distance "Dc." As shown in FIG. 10a-10c, "Dc" is greater than "Db," and "Db" is greater than "Da." Accordingly, "Ga" is greater than "Gb," and "Gb" is greater than "Gc." As a result, by rotating the cam portion 107a, the operator can adjust the gap G between the two rollers 103, 105, which accordingly determines the thickness of the food items to be processed.

FIG. 4 is a side view illustrating the dough sheeting apparatus 100 in accordance with embodiments of the disclosed technology. FIG. 4 illustrates the location of the motor 113 relative to the frame 111. As shown, the motor 113 is obliquely positioned, forming an angle Θ relative to vertical reference axis Ry. This arrangement enables the rear roller 105 to be readily uninstalled, without move/uninstall the motor 113. As shown, a worm gear 1132 extended from the motor 113. Because the motor 113 is obliquely positioned, the worm gear 1132 can precisely fit and cooperate with the driving gear 115, without restricting the 115 from moving upwardly (e.g., direction Y). When an operator wants to uninstall the rear roller 105, the operator can first move the positioning rods 119a, 119b in direction X. Then the rear roller 105 and the front roller 103 can be removed from the apparatus 100 in direction Y. This configuration enables the rear roller 105 to be directly removed from engaging with the worm gear 1132, without moving/removing the motor 113 or the worm gear 1132. This also allows the operator to quickly install the rear roller 105 back to its operating position.

Figure 5:
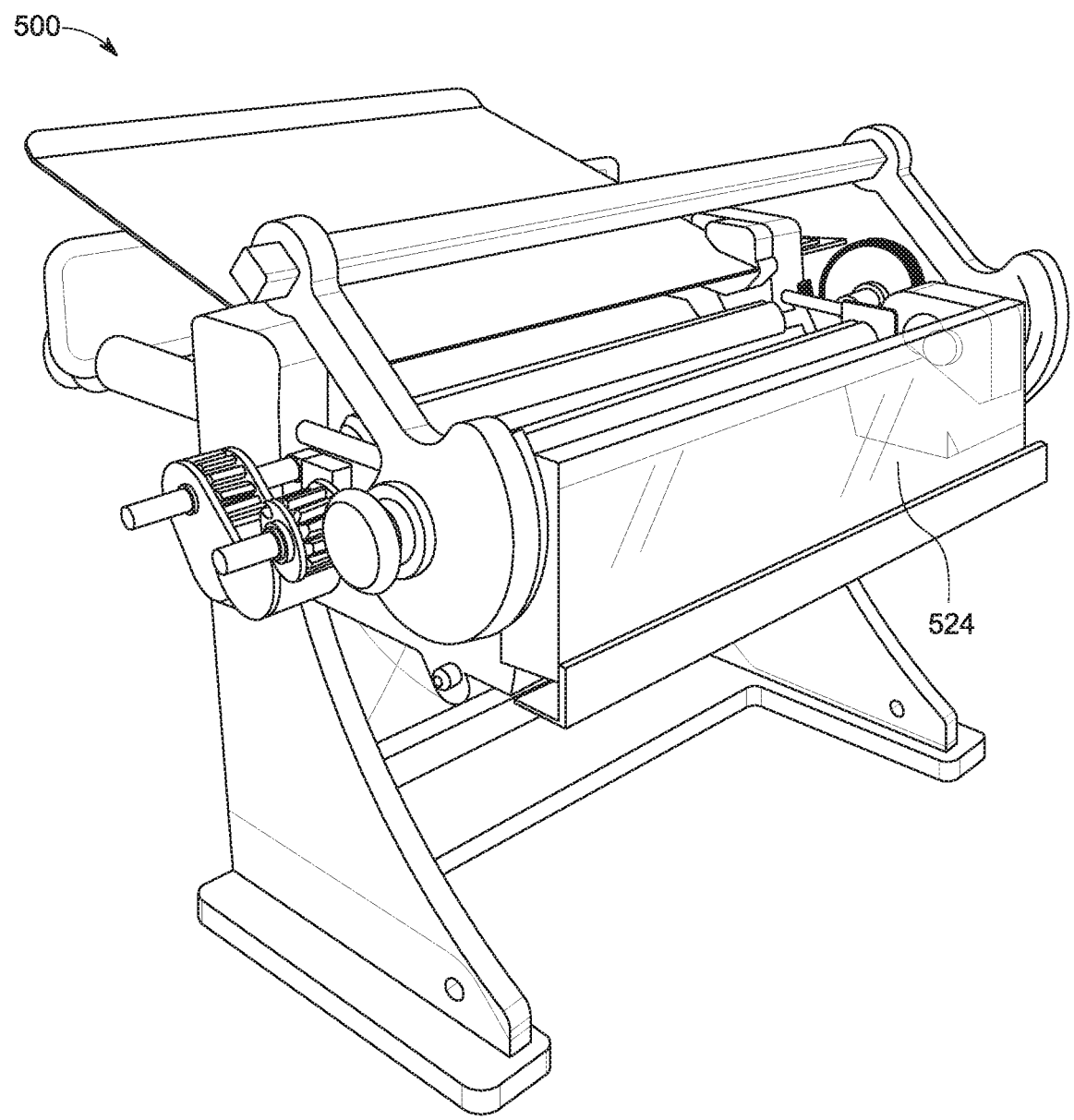
FIG. 5 is an isometric view illustrating a dough sheeting apparatus in accordance with embodiments of the disclosed technology.

FIG. 5 is an isometric view illustrating a dough sheeting apparatus 500 in accordance with embodiments of the disclosed technology. Compared to the apparatus 100 discussed above, the apparatus 500 includes a transparent front panel 524. The transparent front panel 524 enables an operator to see through the front panel 521 and monitor the food material being processed.

Figure 7:
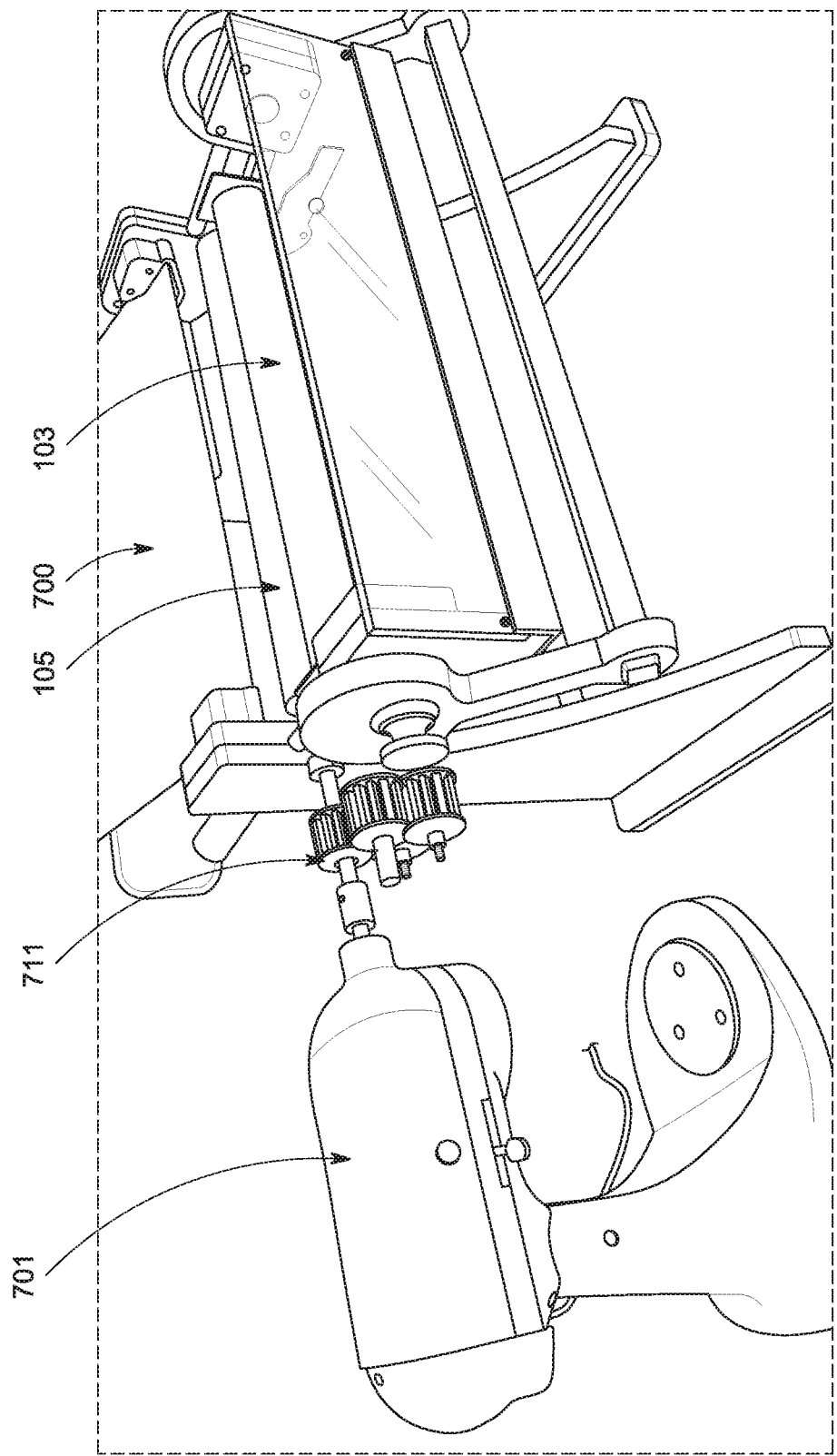
FIG. 7 is a schematic diagram illustrating operations of a dough sheeting apparatus in accordance with embodiments of the disclosed technology.

FIG. 7 is a schematic diagram illustrating operations of a dough sheeting apparatus 700 in accordance with embodiments of the disclosed technology. Compared to the embodiments of the apparatus 100 discussed above, the apparatus 700 does not include the motor 113 and components related thereto. Instead, the apparatus 700 includes an external driving gear set 711 configured to enable an external motor 701 to drive or rotate the rear roller 105. In some embodiments, the external motor 701 can be used to drive the front roller 103 in a similar fashion. In the illustrated embodiment, the external motor is a conventional mixer assembly that has a drive shaft. A coupling is removable connectable to the external driving gear set 711, such that activation of the mixer drives the front and rear rollers 103 and 105 via the driving gear set. Other embodiments can use other external motors to drive the rollers 103 and 105.

Figure 9A:
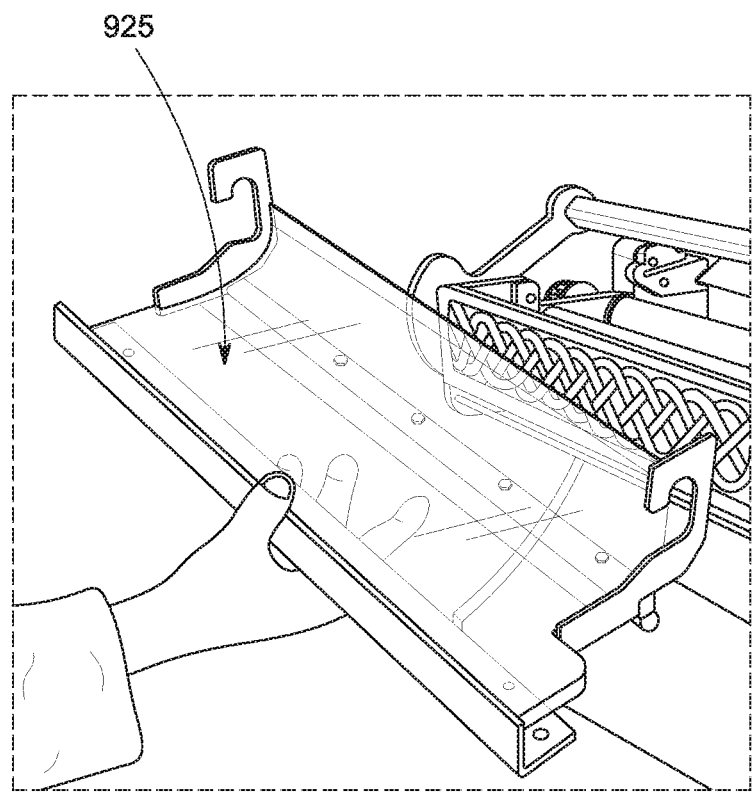
FIGS. 9a and 9b are schematic diagrams illustrating a front scraper in accordance with embodiments of the disclosed technology.
Figure 9B:
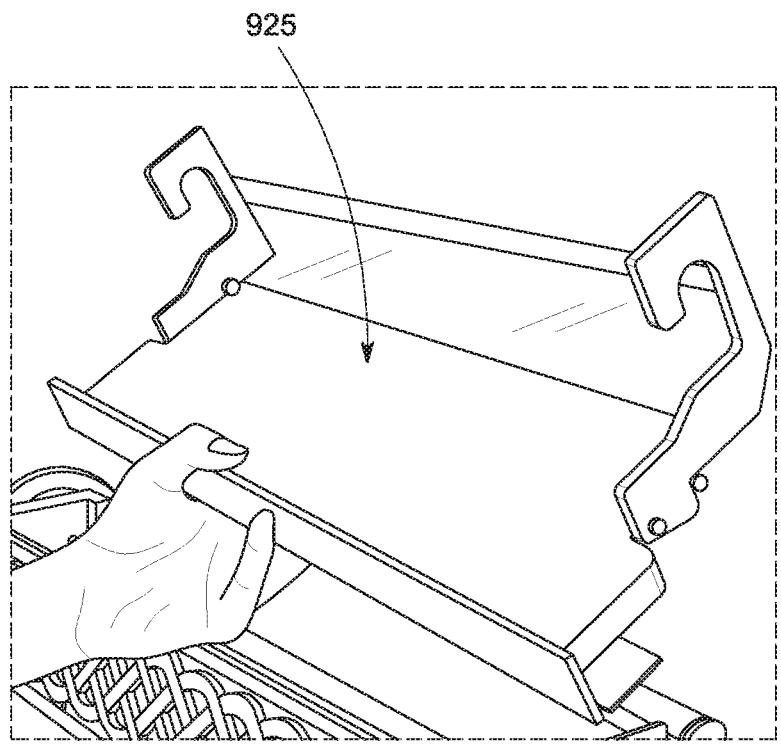

FIGS. 9a and 9b are schematic diagrams illustrating a front scraper 925 in accordance with embodiments of the disclosed technology. In the illustrated embodiment in FIG. 9a, the front scraper 925 can be made of a transparent material (e.g., acrylic, poly-methyl-methacrylate, etc.) which enables an operator to see it through during operation. In other embodiments, such as those described in FIG. 9b, the front scraper 925 can be made of wood, plastic, metal, or other non-transparent material and can only have a portion thereof being made of a transparent material to provide window features.

FIG. 9c is a schematic diagram showing a reversible dough sheeting process in accordance with embodiments of the disclosed technology. The present apparatus 900 has a front scraper 125 having a transparent structure 901. The transparent structure 901 enables an operator to visually observe a food item to be processed 903 (in FIG. 9c, shown as a piece of paper). It is advantageous that the operator can directly observe the food item to be processed 903, because doing so allows the operator to determine when to stop a "forward" rolling process and then initiate a "reverse" rolling process. For example, as indicated in FIG. 9c, the "forward" rolling process means that the food item 903 is moved in direction D1. The "reverse" rolling process means that the food item 903 is moved in direction D2. In some embodiments, the operator can initiate the "reverse" rolling process shortly before the whole food item 903 passes through the two rollers 103, 105. In some embodiments, the operator can repeat the forward/reverse rolling processes as many times as appropriate.

Figures 9D, 9E:
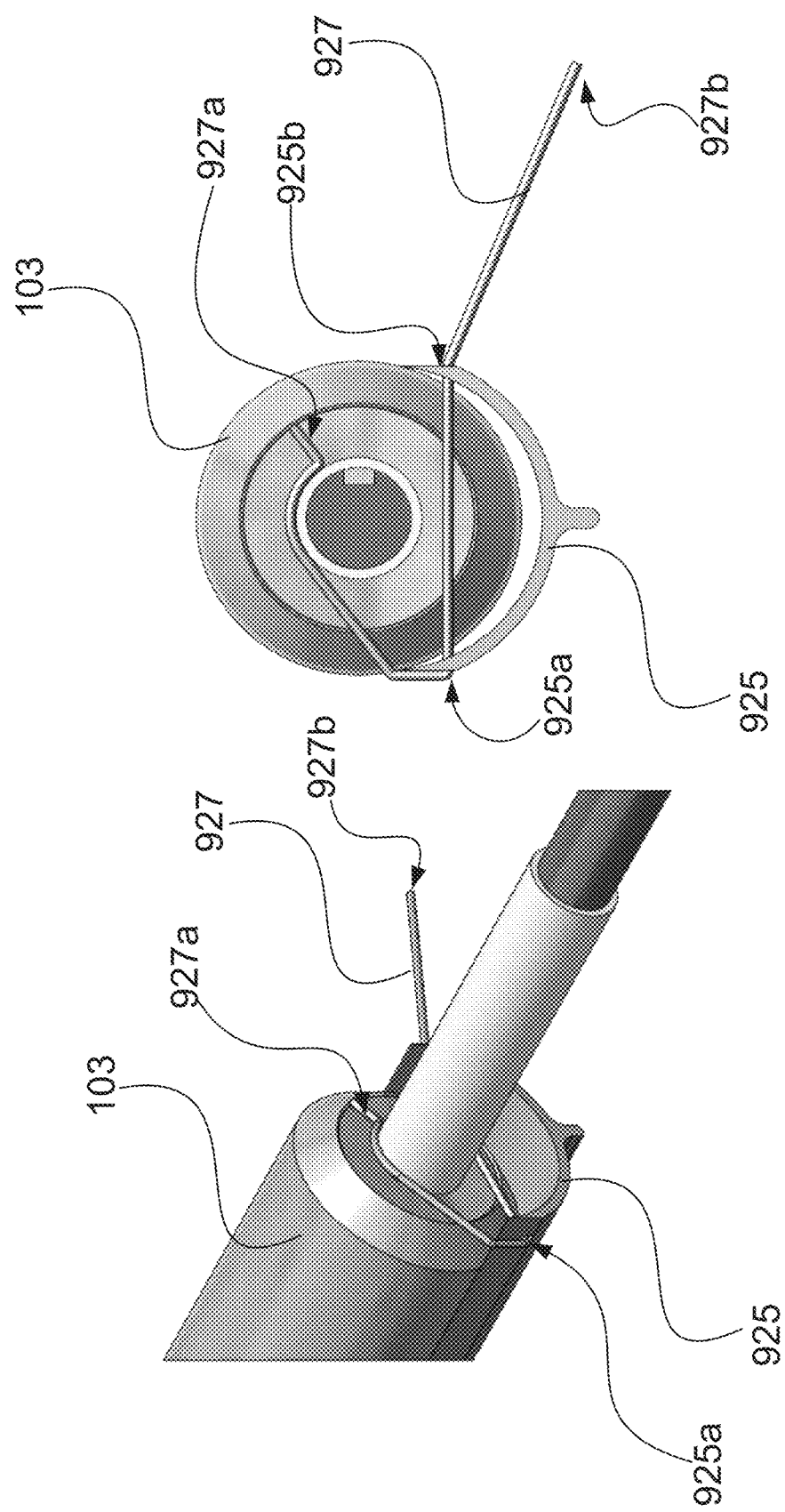
FIGS. 9d and 9e are schematic diagrams illustrating embodiments of a front scraper in accordance with embodiments of the disclosed technology.

FIGS. 9d and 9e are schematic diagrams illustrating embodiments of the front scraper 925 in accordance with embodiments of the disclosed technology. As shown in FIGS. 9d and 9e, the front scraper 925 can be formed with an arcuate shape, such as a semi-circular cross section. As shown in the illustrated embodiment, the upper edges of the front scraper 925 are configured to closely contact the roller 103 to remove excessive food items that may be stuck to the roller as the roller 103 rotates relative to the scraper's edge. In other embodiment, the front scraper can be configured so just one of its upper edges is positioned for engagement with the roller to scrape the roller during operation. The illustrated front scraper 925 is formed with first and second through holes 925a and 925b configured to accommodate a pin member 927, which maintains the location of the front scraper 925 relative to the roller 103. In some embodiments, the pin member 927 can be made of metal, plastic, or other suitable materials. In some embodiments, the pin member 927 can include a bending portion 927a configured to enable a user to hold it and temporarily deform the pin member 927 such that the user can remove the roller 103 from the front scraper 925. In some embodiments, a distal end 927b of the pin member 927 can be operably coupled to the frame 101 of the apparatus 100.

Figure 11:
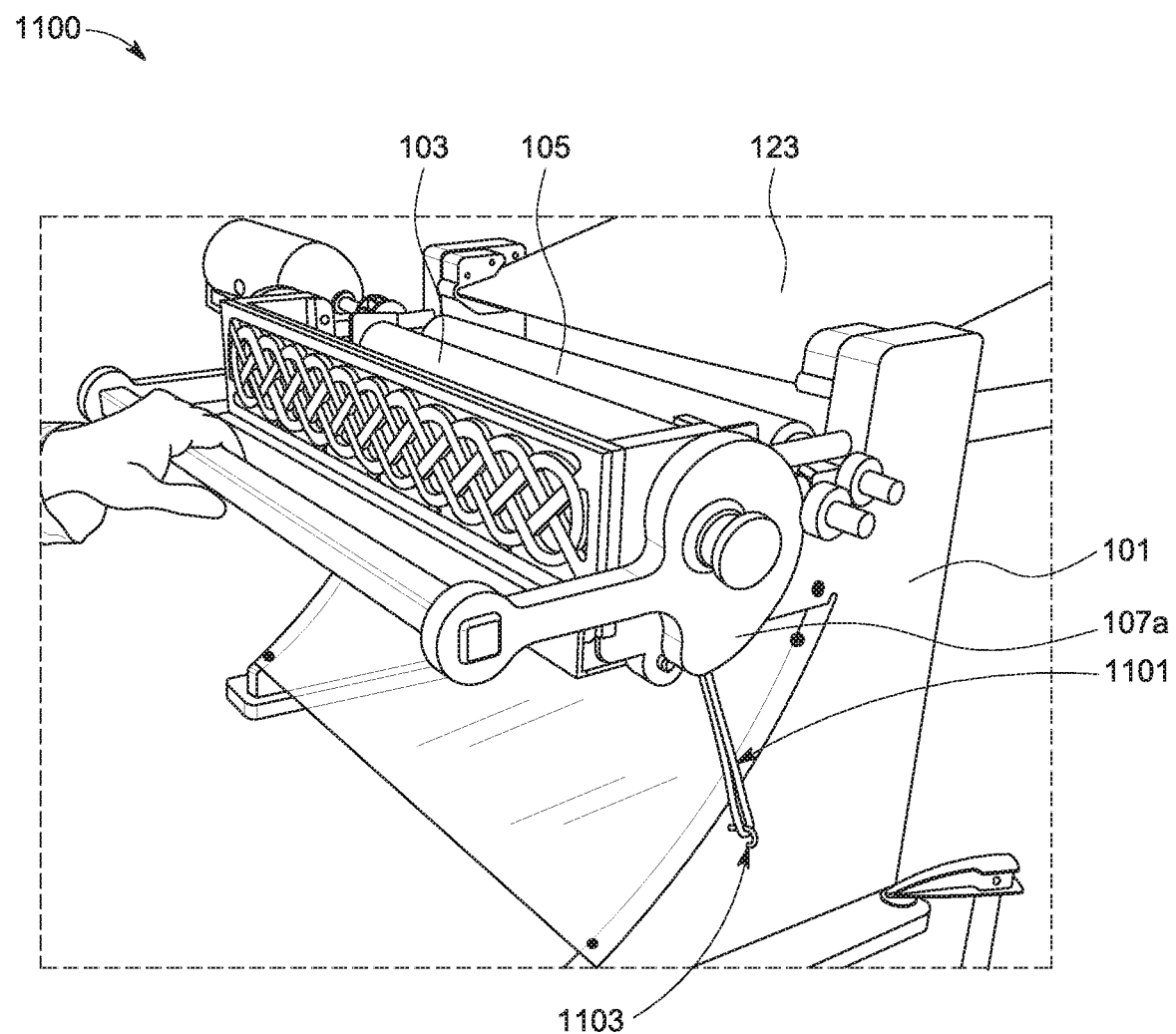
FIG. 11 is a schematic diagram showing a resilient component in accordance with embodiments of the disclosed technology.

FIG. 11 is a schematic diagram showing a resilient component 1101 in accordance with embodiments of the disclosed technology. As shown in FIG. 11, an apparatus 1100 includes the frame 101 configured to operably support the front roller 103 and the rear roller 105. As shown, a hook 1103 is attached to the frame 101. The hook 1103 is further attached to one end of the resilient component 1101. The other end of the resilient component 1101 is operably coupled to the cam component 107a. By this arrangement, the resilient component 1101 can facilitate maintaining the position of the cam component 107a, after an operator rotates it. In the illustrated embodiment, the resilient component 1101 includes a flexible band, such as a rubber band or other elastic band. In some embodiments, the resilient component 1101 can include other suitable components such as a spring.

Figure 12A:
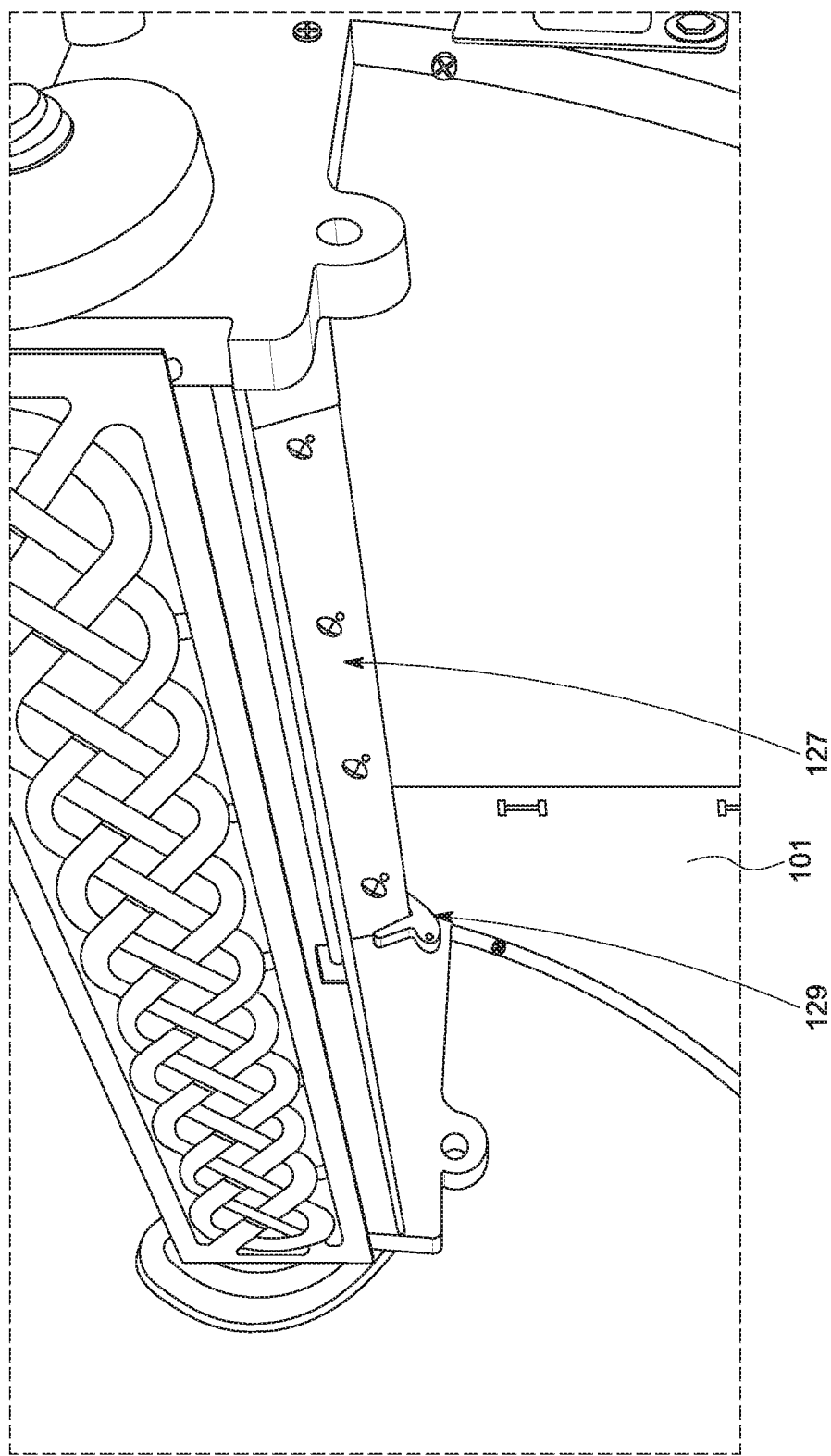
FIGS. 12a and 12b are schematic diagrams illustrating a rear scraper and a support saddle in accordance with embodiments of the disclosed technology.
Figure 12B:
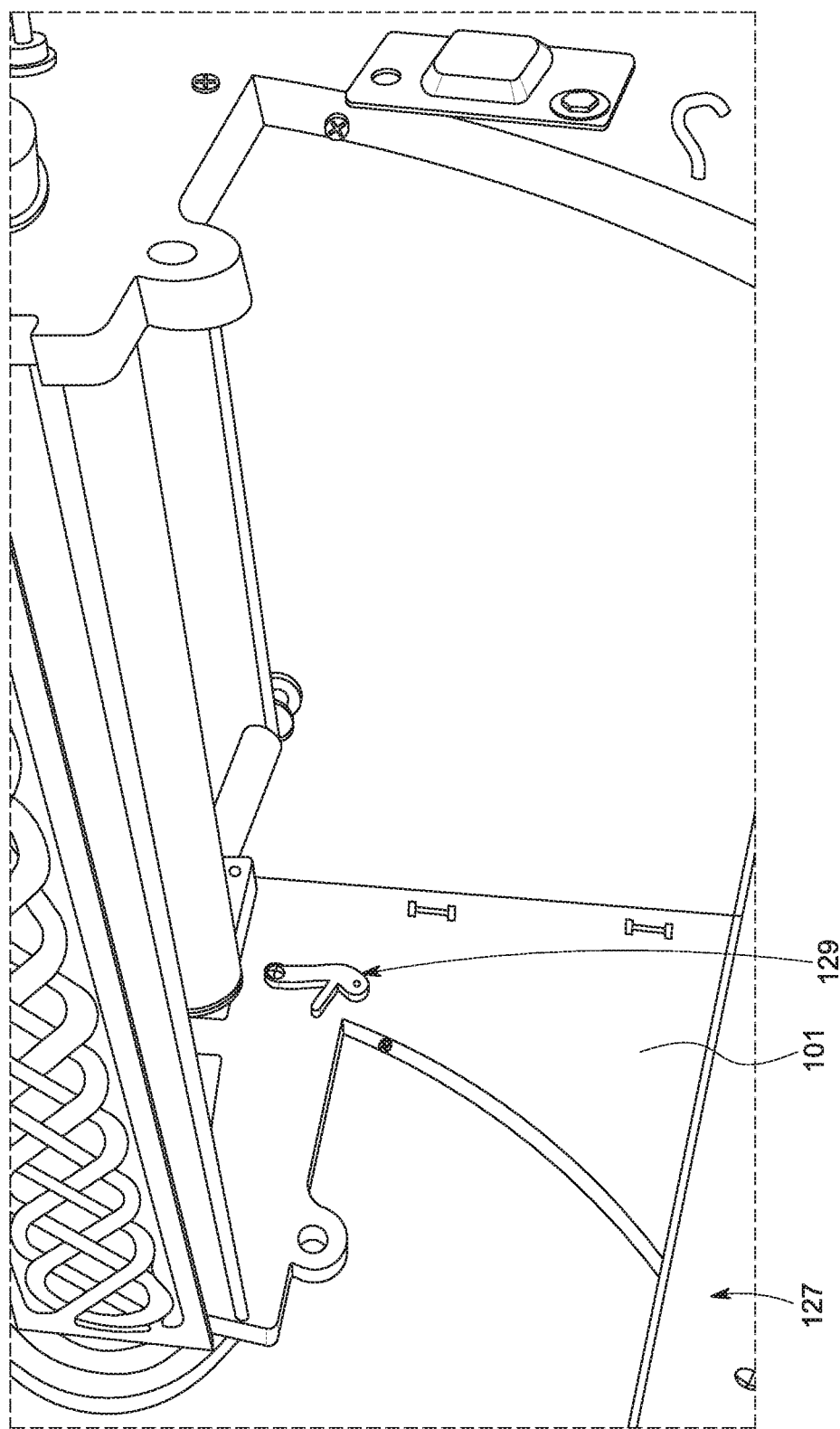

FIGS. 12a and 12b are schematic diagrams illustrating the rear scraper 127 and the support saddle 129 in accordance with embodiments of the disclosed technology. As shown in FIG. 12a, the support saddle 129 can be attached to the frame 101 positioned to support the rear scraper 127 (FIG. 12a). When an operator wants to remove the rear scraper 127 (e.g., to clean, replace, or maintain) from the frame 101, the operator can rotate the support saddle 129 (FIG. 12b) and then the rear scraper 127 can be readily removed from the frame 101.

Figure 13:
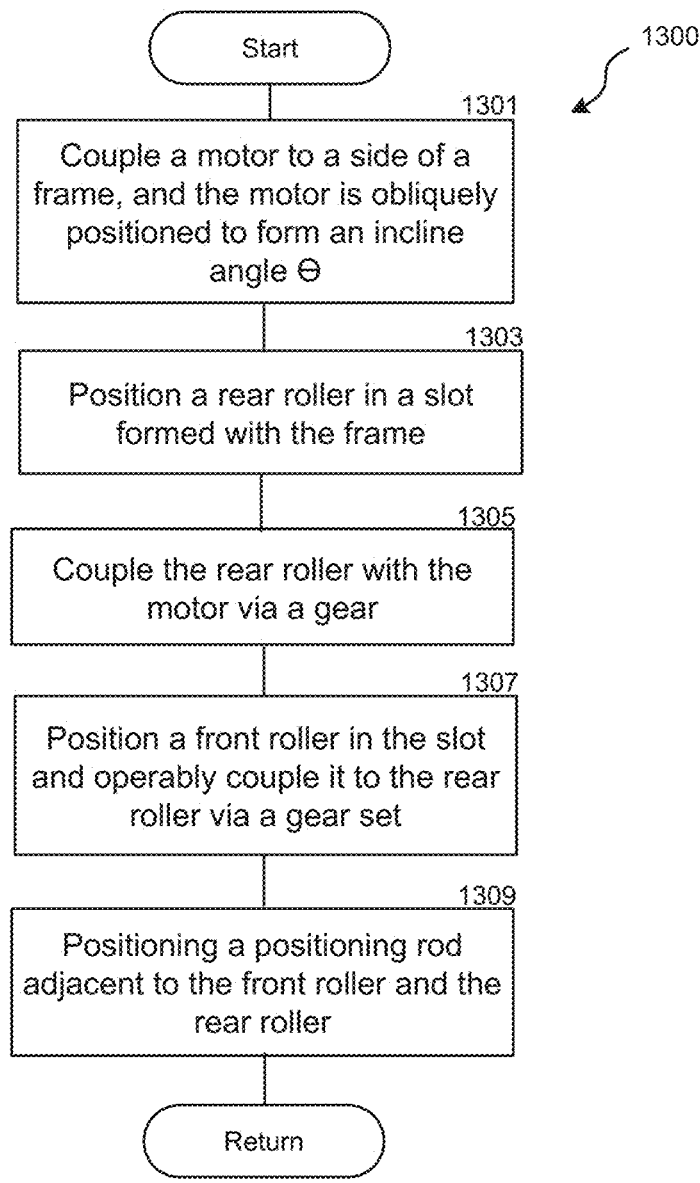
FIG. 13 is a flowchart illustrating a method in accordance with embodiments of the disclosed technology.

FIG. 13 is a flowchart illustrating a method 1300 in accordance with embodiments of the disclosed technology. The method 1300 is configured to assembly a dough processing apparatus. The method 1300 starts at block 1301 by coupling a motor (e.g., the motor 113) to a side of a frame (e.g., the frame 101), and the motor is vertically, obliquely positioned to form an incline angle Θ. In some embodiments, the incline angle Θ can range from 5 degrees to 30 degrees. In some embodiments, the incline angle Θ is determined based on the size of a gear (e.g., the driving gear 115) coupled to the motor.

At block 1303, the method 1300 continues by positioning a rear roller (e.g., the rear roller 105) in a slot formed with the frame. At block 1305, the method 1300 then couples the rear roller with the motor via the gear. At block 1307, a front roller (e.g., the front roller 103) is positioned in the slot and is operably coupled to the rear roller via a gear set (e.g., the roller-transmission gear set 111). At block 1309, the method 1300 continues by positioning a positioning rod (e.g., the positioning rod 119a or 119b) adjacent to the front roller and the rear roller. The positioning rod passes through a through hole (e.g., the through hole 117a or 117b) of the frame. In some embodiments, the method 1300 further includes operably coupling a cam component to the frame and positioning the cam portion adjacent to the front roller such that the cam portion can laterally move the front roller when the cam portion rotates.

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

The invention claimed is:

1. An apparatus for processing a food item comprising:
   a frame formed with a through hole and first and second slots spaced apart from each other;
   a motor obliquely attached to a side wall of the frame;
   a rear roller positioned in the first slot and operably coupled to the motor;
   a front roller positioned in the second slot and operably coupled to the rear roller;
   a positioning rod positionable in the through hole and movable between first and second positions, in the first position the positioning rod extends over the first and second slots to removably retain the rear and front rollers in the first and second slots, respectively, and in the second position the positioning rod is away from and uncovering the first and second slots to allow the rear and front rollers to be removed from the first and second slots;
   a cam component operably attached to the frame and positioned adjacent to the front roller such that when the cam component is rotated, the front roller is moved toward or away from the rear roller;
   a front scraper positioned immediately adjacent to the front roller and configured to scrape material off of the front roller, wherein the front scraper is movable with the front roller relative to the rear roller; and
   a shim member removably positionable adjacent to the front roller to block the front roller from moving toward the rear roller past a selected position to maintain a selected minimum distance between the rear and front rollers related to the size of the shim member.

2. The apparatus of claim 1, wherein the cam component is coupled to a handle bar.

3. The apparatus of claim 1, further comprising a rear scraper positionable immediately adjacent to the rear roller and configured to scrape material off of the rear roller.

4. The apparatus of claim 1 wherein the frame has a pair of spaced apart first and second frame arms, the first frame arm having the through hole and the first and second slots, wherein the through hole is a first through hole, and the second frame arm having a second trough hole and third and fourth slots, wherein the rear roller is removably positioned in the first and third slots, and the front roller is removably and adjustably positioned in the second and fourth slots; wherein the positioning rod is a first positioning rod, and the assembly further comprising a second positioning rod parallel to the first positioning rod and positionable through the second through hole to removably cover the third and fourth slots to removably retain the rear and front rollers in the third and fourth slots.

5. The apparatus of claim 4 wherein the first and second through holes are aligned substantially perpendicular to the axis of the rear roller.

6. The apparatus of claim 4, further comprising a tray support coupled to the first and second positioning rods and a dough-feeding tray positionable on the tray support and having a leading edge adjacent to the rear and front rollers.

7. The apparatus of claim 1, further comprising a tray support coupled to the positioning rod and a dough-feeding tray positionable on the tray support and having a leading edge adjacent to the rear and front rollers.

8. The apparatus of claim 1 wherein the shim member is coupled to the front scraper.

9. An apparatus for processing a food item comprising:
a frame formed with a through hole and first and second slots spaced apart from each other;
a first roller positioned in the first slot;
a second roller positioned in the second slot and operably coupled to and spaced apart from the first roller;
a drive portion connected to the first or second roller, wherein the drive portion is configured to removably attach to a mixer assembly to operably rotate the first or second rollers;
a positioning rod positionable in the through hole and movable between first and second positions, in the first position the positioning rod extends over the first and second slots to removably retain the first and second rollers in the first and second slots, respectively, and in the second position the positioning rod is away from and uncovering the first and second slots to allow the first and second rollers to be removed from the first and second slots;
a hand-operated cam assembly operably attached to the frame and positioned adjacent to the second roller such that when the cam assembly is rotated, the second roller is moved toward or away from the first roller;
a scraper positioned immediately adjacent to the second roller and configured to scrape material off of the second roller, wherein the scraper is movable with the second roller relative to the first roller; and
a shim member coupled to the scraper and removably positionable adjacent the hand-operated cam assembly to block the second roller from moving toward the first roller past a selected position to maintain a selected minimum distance between the first and second rollers.

10. The apparatus of claim 9, wherein the hand-operated cam assembly has at least one cam member connected to the second roller and a handle connected to the cam member, wherein movement of the handle causes rotation of the cam member and linear movement of the second roller toward or away from the first roller.

11. The apparatus of claim 9, further comprising a second scraper positionable immediately adjacent to the first roller and configured to scrape material off of the first roller.

12. The apparatus of claim 9 wherein the frame has a pair of spaced apart first and second frame arms, the first frame arm having the through hole and the first and second slots, wherein the through hole is a first through hole, and the second frame arm having a second through hole and third and fourth slots, the first roller is removably positioned in the first and third slots, and the second roller is removably and adjustably positioned in the second and fourth slots; wherein the positioning rod is a first positioning rod, and the assembly further comprising a second positioning rod parallel to the first positioning rod and positionable through the second through hole to removably cover the third and fourth slots to removably retain the first and second rollers in the third and fourth slots.

13. The apparatus of claim 12 wherein the first and second through holes are aligned substantially perpendicular to the axis of the first roller.

14. The apparatus of claim 12, further comprising a tray support coupled to the first and second positioning rods and a dough-feeding tray positionable on the tray support and having a leading edge adjacent to the first and second rollers.

15. The apparatus of claim 9, further comprising a tray support coupled to the positioning rod, and a dough-feeding tray positionable on the tray support and having a leading edge adjacent to the first and second rollers.

* * * * *